(12) United States Patent
Dhara et al.

(10) Patent No.: US 7,374,718 B2
(45) Date of Patent: May 20, 2008

(54) RADIATION STABLE AROMATIC CARBONATE POLYMER COMPOSITIONS

(75) Inventors: Dibakar Dhara, Bangalore (IN); Katherine C. Glasgow, Evansville, IN (US); Vikram Kumar, Bangalore (IN)

(73) Assignee: General Electric Company, Schenectady, NY (US)

( * ) Notice: Subject to any disclaimer, the term of this patent is extended or adjusted under 35 U.S.C. 154(b) by 309 days.

(21) Appl. No.: 11/244,600

(22) Filed: Oct. 6, 2005

(65) Prior Publication Data

US 2007/0081918 A1    Apr. 12, 2007

(51) Int. Cl.
*A61L 2/08* (2006.01)
*C08K 5/053* (2006.01)
*C08L 69/00* (2006.01)

(52) U.S. Cl. .......... 422/22; 523/136; 524/383

(58) Field of Classification Search .......... None
See application file for complete search history.

(56) References Cited

U.S. PATENT DOCUMENTS

| | | | |
|---|---|---|---|
| 2,288,282 A | 6/1942 | Huismann | 260/607 |
| 2,739,171 A | 3/1956 | Linn | 260/613 |
| 2,999,835 A | 9/1961 | Goldberg | 260/42 |
| 3,020,331 A | 2/1962 | Schwartz | 174/62 |
| 3,028,365 A | 4/1962 | Schnell et al. | 260/47 |
| 3,153,008 A | 10/1964 | Fox | 260/47 |
| 3,169,121 A | 2/1965 | Goldberg | 260/47 |
| 3,207,814 A | 9/1965 | Goldberg | 260/860 |
| 3,334,151 A | 8/1967 | Okazaki | 260/651 |
| 4,001,184 A | 1/1977 | Scott | 260/47 XA |
| 4,018,750 A | 4/1977 | Onizawa | 260/78 A |
| 4,123,436 A | 10/1978 | Holub et al. | 260/30.8 R |
| 4,131,575 A | 12/1978 | Adelmann et al. | 260/17.4 R |
| 4,156,069 A | 5/1979 | Prevorsek et al. | 528/182 |
| 4,194,038 A | 3/1980 | Baker et al. | 528/182 |
| 4,880,850 A | 11/1989 | Nelson | |

FOREIGN PATENT DOCUMENTS

WO    WO 2005 052024 A    6/2005

OTHER PUBLICATIONS

International Search Report dated Apr. 10, 2007.

*Primary Examiner*—David J. Buttner

(57) ABSTRACT

A composition comprising an aromatic carbonate polymer and an amount of at least one solid cyclic aliphatic alcohol stabilizing compound sufficient to inhibit yellowing of the composition upon exposure to a sterilizing radiation, wherein said stabilizing compound is selected from the group consisting of 2,2,4,4-tetramethylcyclobutane-1,3-diol, 1,4-cyclohexanediol, and wherein said stabilizing compound is present in said composition in an amount of at least about 0.2 parts by weight per 100 parts by weight of said aromatic carbonate polymers.

12 Claims, No Drawings

RADIATION STABLE AROMATIC CARBONATE POLYMER COMPOSITIONS

BACKGROUND

The present disclosure relates to aromatic carbonate polymers and blends rendered resistant to coloring caused by exposure to sterilizing irradiation. More particularly, this disclosure relates to aromatic carbonate polymers and blends containing cyclic aliphatic alcohol compounds that are effective for color stabilizing the polymers and blends.

Aromatic carbonate polymers are well-known engineering thermoplastics with an excellent balance of optical, physical, mechanical, and processing characteristics. Various grades of aromatic carbonate polymers are widely used in a range of medical applications because of the material's transparency, toughness, rigidity, heat resistance, dimensional stability, and moldability in intricate parts. Many medical devices produced from aromatic carbonate polymers for example, dialysis and anesthesia canisters, syringes, stopcocks, blood oxygenators, cardiometry reservoirs, intravenous connectors and accessories, blood filters, trocars, stopcocks, luer locks, Y-sites, catheters, trays, dental instruments, pipettes, glucose meters, inhalers and centrifuge bowls, require sterilization to help ensure product safety. One of the most popular medical sterilization techniques includes exposing the device containing an aromatic carbonate polymer to ionizing irradiation. However, exposure of the aromatic carbonate polymers to radiation causes color formation, e.g., yellowing of the aromatic carbonate polymer.

A variety of additives have been tried to retard color formation, e.g., yellowing, to aromatic carbonate polymers after exposure to sterilizing radiation. Some additives e.g., liquid additives have shown positive effects towards retarding discoloration of the polymer after radiation sterilization, but these additives have certain disadvantages. They have lower flash points and hence at least some part of the additives lost during processing and also potential hazard while extruding the aromatic carbonate polymers comprising the liquid additives at elevated temperatures.

Hence, there is a need for new additives for use with aromatic carbonate polymer compositions that are easier to incorporate into the composition and at the same time provide inhibition to color formation that occurs after exposure to sterilizing radiation.

BRIEF SUMMARY

Disclosed herein are an aromatic carbonate polymer composition, a method of color stabilizing the aromatic carbonate composition, and an article comprising the aromatic carbonate composition. The aromatic carbonate composition comprises an aromatic carbonate polymer and an amount of at least one solid cyclic aliphatic alcohol stabilizing compound sufficient to inhibit yellowing of the composition upon exposure to a sterilizing radiation, wherein said stabilizing compound is selected from the group consisting of 2,2,4,4-tetramethylcyclobutane-1,3-diol, and 1,4-cyclohexanediol, and wherein said stabilizing compound is present in said composition in an amount of at least about 0.1 parts by weight per 100 parts by weight of said aromatic carbonate polymers.

The method of color stabilizing an aromatic carbonate polymer composition comprises mixing an aromatic carbonate polymer and a solid phase cyclic aliphatic alcohol compound to form a homogeneous mixture, wherein the solid phase cyclic aliphatic alcohol compound selected from the group consisting of 2,2,4,4-tetramethylcyclobutane-1,3-diol, 1,4-cyclohexanediol, and mixtures thereof; molding the composition into an article; and exposing the article to radiation in an amount effective to sterilize the article to produce a sterilized article.

The article comprises an aromatic carbonate polymer composition comprising an aromatic carbonate polymer and a solid phase cyclic aliphatic alcohol compound in an amount less than 5 parts by weight per 100 parts by weight of said aromatic carbonate polymer, wherein upon exposure to 25 kGY of gamma radiation a change in yellowness index is less than 8.1.

The disclosure may be understood more readily by reference to the following detailed description of the various features of the disclosure and the examples included therein.

DETAILED DESCRIPTION

The present disclosure may be best understood more readily by reference to the following detailed description of preferred embodiments of the disclosure and the examples included therein. In the following specification and the claims that follow, reference will be made to a number of terms which shall be defined to have the following meanings. The singular forms "a", "an" and "the" include plural referents unless the context clearly dictates otherwise. All ranges disclosed herein are inclusive and combinable (e.g., ranges of "up to 25 wt. percent, with 5 wt. percent to 20 wt. percent desired," is inclusive of the endpoints and all intermediate values of the ranges of "5 wt. percent to 25 wt. percent". The modifier "about" used in connection with a quantity is inclusive of the stated value and has the meaning dictated by the context (e.g., includes the degree of error associated with measurement of the particular quantity).

In one embodiment, the disclosure relates to a composition comprising an aromatic carbonate polymer and at least one solid phase cyclic aliphatic alcohol stabilizing compound in an amount effective to inhibit color formation to the aromatic carbonate polymer composition during exposure to a sterilizing radiation. The cyclic aliphatic alcohol stabilizing compound is present in the composition in an amount of at least about 0.1 parts by weight per 100 parts by weight of said aromatic carbonate polymers.

Suitable solid phase cyclic aliphatic alcohol stabilizing compounds are selected from the group consisting of 2,2,4,4-tetramethylcyclobutane-1,3-diol, 1,4-cyclohexanediol and mixtures of two or more of the foregoing. In one embodiment, the stabilizing compound is present in an amount of at least about 0.1 parts by weight to about 1 part by weight per 100 parts by weight of the aromatic carbonate polymer. In another embodiment, the stabilizing compound is present in an amount of about 0.1 to about 0.4 parts by weight per 100 parts by weigh of the aromatic carbonate polymer.

In one embodiment, the aromatic carbonate polymer composition in addition to the solid phase cyclic aliphatic alcohol compound may further comprise stabilizing compounds comprising linear aliphatic diols such as ethylene glycol, propylene glycol, 1,3-propane diol, 1,2-butanediol, 1,4-butanediol, meso-2,3-butanediol, 1,2-pentanediol, 2,3-pentane diol, 1,4-pentane diol, 1,4-hexanediol, 2-methyl-2,4-pentanediol, and the like. The total amount of stabilizing compound including the solid phase cyclic aliphatic alcohol and the linear aliphatic diols present in the compositions is greater than 0.1 parts by weight of the aromatic carbonate wherein at least 0.1 parts by weight of stabilizing compound present in the aromatic carbonate polymer is the solid phase cyclic aliphatic alcohol compound.

The aromatic carbonate polymers considered for use herein generally include polycarbonates, copolyestercarbonates and mixtures thereof. Suitable aromatic carbonate polymers for use herein can generally be prepared by reacting a dihydric phenol with a carbonate precursor, such as phosgene, a haloformate or a carbonate ester.

In one embodiment, the aromatic carbonate polymers may comprise recurring structural units of the Formula I:

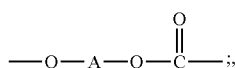
(I)

wherein A is a divalent aromatic radical of the dihydric phenol employed in the polymer producing reaction. In another embodiment, the aromatic carbonate polymers are selected to have a melt volume rate (MVR) between 40 to 5 centimeter cube per minute as measured by keeping the polymer at 300° C. under 1.2 KG load for a period of 6 minutes.

In one embodiment, suitable dihydric phenols that may be employed to provide aromatic carbonate polymers comprise mononuclear or polynuclear aromatic compounds, containing two hydroxy radical functional groups, each of which is attached directly to a carbon atom of an aromatic nucleus. Suitable dihydric phenols include, but are not limited to, 2,2-bis(4-hydroxyphenyl)propane; hydroquinone; resorcinol; 2,2-bis-(2-hydroxyphenyl)pentane; 2,4'-dihydroxydiphenylmethane; bis-(2-hydroxyphenyl)methane; bis-(4hydroxyphenyl)methane; bis-(4-hydroxy-5-nitrophenyl) methane; 1,1-bis(4-hydroxyphenyl)ethane; 3,3-bis(4-hydroxyphenyl)pentane; 2,2-dihydroxydiphenyl; 2,6-dihydroxynaphthalene; bis-(4-hydroxydiphenyl)sulfone; bis-(3,5-diethyl-4-hydroxyphenyl)sulfone; 2,2-bis-(3,5-dimethyl-4-hydroxyphenyl)propane; 2,4'-dihydroxydiphenyl sulfone; 5'-chloro-2,4'-dihydroxydiphenyl sulfone; bis-(4-hydroxyphenyl)diphenyl sulfone; 4,4'-dihydroxydiphenyl ether; 4,4'-dihydroxy-3,3'-dichorodiphenyl ether; 4,4'-dihydroxy-2,5-dihydroxydiphenyl ether; and the like. Still other suitable dihydric phenols are disclosed in U.S. Pat. Nos. 2,999,835; 3,028,365; 3,334,154; and 4,131,575, incorporated herein by reference in their entireties.

These aromatic carbonate polymers (hereinafter at times referred to as "aromatic polycarbonates") may be manufactured by various well known processes, as mentioned above, by reacting a dihydric phenol with a carbonate precursor, such as phosgene, in accordance with methods set forth in the above-cited literature and U.S. Pat. Nos. 4,018,750 and 4,123,436, or by transesterification processes as disclosed in U.S. Pat. No. 3,153,008, as well as other processes known to those skilled in the art. It is possible to employ two or more different dihydric phenols or a copolymer of a dihydric phenol with a glycol or with a hydroxy or acid terminated polyester or with a dibasic acid in the event a carbonate copolymer or interpolymer rather than a homopolymer is desired for use in the preparation of the aromatic polycarbonate mixtures.

In one embodiment, branched aromatic polycarbonates are also useful, such as are described in U.S. Pat. No. 4,001,184. In certain other embodiments, blends of a linear aromatic polycarbonate and a branched aromatic polycarbonate may also be employed. Moreover, blends of any of the above materials may be employed. In one embodiment, the aromatic carbonate polymer employed is a homopolymer derived from 2,2-bis(4-hydroxyphenyl)propane (bisphenol-A; BPA).

Suitable copolyester aromatic carbonates include recurring carbonate groups of formula (II):

(II)

and carboxylate groups of formula (III):

(III)

and aromatic carbocyclic groups in the linear polymer chain, wherein at least some of the carboxylate groups and at least some of the carbonate groups are bonded directly to ring carbon atoms of the aromatic carboxylic groups. These copolyester aromatic carbonate copolymers in general are prepared by reacting a difunctional carboxylic acid or ester forming derivative, a dihydric phenol, and a carbonate precursor.

The dihydric phenols suitable in formulating the copolyestercarbonate may be represented by the general Formula (IV):

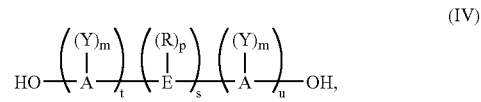
(IV)

wherein A is an aromatic group such as phenylene, biphenylene, naphthylene, anthrylene, and the like. E is an alkylene or alkylidene group such as methylene, ethylene, propylene, propylidene, isopropylidene, butylene, butylidene, isobutylidene, amylene, isoamylene, amylidene, isoamylidine and is generally from one to twelve carbon atoms. When E is an alkylene or alkylidene group, it may also consist of two or more alkylene or alkylidene groups, connected by a nonalkylene or non-alkylidene group such as an aromatic linkage, a tertiary amino linkage, an ether linkage, a carbonyl linkage, a silicon-containing linkage, or by a sulfur-containing linkage such as sulfide, sulfoxide, sulfone, etc. In addition, E may be a cycloaliphatic group of five to seven carbon atoms, inclusive (e.g. cyclopentyl, cyclohexyl), or a cycloalkylidene of five to seven carbon atoms inclusive, such as cyclohexylidene, a sulfur containing linkage, such as sulfide, sulfoxide or sulfone; an ether linkage; a carbonyl group; a tertiary nitrogen group, or a silicon containing linkage such as silane or siloxy. Other groups which E may represent will occur to those skilled in the art. R is hydrogen or a monovalent hydrocarbon group such as an alkyl group of one to eight carbon atoms, inclusive (methyl, ethyl, propyl, and the like), aryl (phenyl, naphthyl, and the like), aralkyl (benzyl, ethylphenyl, and the like) or cycloaliphatic of five to seven carbon atoms, inclusive (cyclopentyl, cyclohexyl, and the like). Y may be an inorganic atom such as chlorine, bromine, fluorine, etc.; an organic group such as the nitro group, etc.; an organic group such as R above, or an oxy group such as OR, it being only necessary that Y be inert to and unaffected by the reactants and the reaction conditions. The term "m" is any whole integer from and including zero through the number of positions on A available for substitution; "p" is any whole integer from and including zero through the number of available positions on E; "t" is a whole integer equal to at least one, "s" is either zero or one, and u is any whole integer including zero.

In the dihydric phenol compound represented by Formula (IV) above, when more than one Y substituent is present, they may be the same or different. The same is true for the R substituent. Where "s" is zero in Formula (IV) and "u" is not zero, the aromatic rings are directly joined with no intervening alkylene or other bridge. The positions of the hydroxyl groups and Y on the aromatic nuclear residues A can be varied in the ortho, meta, or para positions and the groupings can be in a vicinal, asymmetrical or symmetrical relationship, where two or more ring carbon atoms of the aromatic hydrocarbon residue are substituted with Y and hydroxyl group.

Examples of dihydric phenol compounds that may be employed in the copolyestercarbonate include: 2,2-bis-(4-hydroxyphenyl)propane (bisphenol-A); 2,4'-dihydroxydiphenylmethane; bis-(2-hydroxyphenyl)methane; bis-(4-hydroxyphenyl)methane; bis-(4-hydroxy-5-nitrophenyl)methane; bis-(4-hydroxy-2,6-dimethyl-3-methoxyphenyl)-methane; 1,1-bis-(4-hydroxyphenyl)ethane; 1,2-bis-(4-hydroxyphenyl)ethane; 1,1-bis-(4-hydroxy-2-chlorophenyl)ethane; 1,1-bis-(2,5-dimethyl-4-hydroxyphenyl)ethane; 1,3-bis-(3-methyl-4-hydroxyphenyl)propane; 2,2-bis-(3-phenyl-4-hydroxyphenyl)propane; 2,2-bis-(3-isopropyl-4-hydroxyphenyl)propane; 2,2-bis-(4-hydroxynaphthyl)propane; 2,2-bis-(4-hydroxyphenyl)pentane; 3,3-bis-(4hydroxyphenyl)pentane; 2,2-bis-(4-hydroxyphenyl) heptane; bis-(4-hydroxyphenyl)phenylmethane; bis-(4-hydroxyphenyl)cyclohexylmethane; 1,2-bis-(4-hydroxyphenyl)-1,2-bis-(phenyl)propane; 2,2-bis-(4-hydroxyphenyl)-1-phenylpropane; and the like.

In one embodiment the dihydric phenols may also be selected from the group consisting of dihydroxy phenols such as hydroquinone and resorcinol, dihydroxydiphenyls such as 4,4'-dihydroxydiphenyl; 2,2'-dihydroxydiphenyl; 2,4'-dihydroxydiphenyl; dihydroxy-naphthalenes such as 2,6-dihydroxynaphthalene, and the like.

Also useful are dihydric phenols wherein E is a sulfur containing radical such as the dihydroxy aryl sulfones exemplified by: bis(4-hydroxyphenyl)sulfone; 2,4'-dihydroxydiphenyl sulfone; 5-chloro-2,4'-dihydroxy diphenyl sulfone; 3-chloro-bis-(4-hydroxyphenyl) sulfone; and 4,4'-dihydroxytriphenyldisulfone; etc. The preparation of these and other useful sulfones are described in U.S. Pat. No. 2,288,282. Polysulfones as well as substituted sulfones using halogen, nitrogen, alkyl radicals, and the like are also useful.

Dihydroxy aromatic ethers such as those described in U.S. Pat. No. 3,148,172 are useful as the dihydric phenol herein. The dihydroxy aromatic ethers may be prepared as described in U.S. Pat. No. 2,739,171. Suitable dihydroxy aromatic ethers may be selected from the group consisting of but not limited to 4,4'-dihydroxydiphenyl ether; 4,4'-dihydroxytriphenyl ether; the 4,3'-, 4,2'-, 4,1'-, 2,2'-, 2,3'-, etc. dihydroxydiphenyl ethers; 4,4'-dihydroxy-2,6-dimethyldiphenyl ether; 4,4'-dihydroxy-2,5-dimethyldiphenyl ether; 4,4'-dihydroxy-3,3'-diisobutyldiphenyl ether; 4,4'-dihydroxy-3,3'-di-isopropyldiphenyl ether; 4,4'-dihydroxy-3,3'-dinitrodiphenyl ether; 4,4'-dihydroxy-3,3'-dichlorodiphenyl ether; 4,4'-dihydroxy-3,3'-difluorodiphenyl ether; 4,4'-dihydroxy-2,3'-dibromodiphenyl ether; 4,4'-dihydroxydinaphthyl ether; 4,4'-dihydroxy-3,3'-dichlorodinaphthyl ether; 2,4-dihydroxytetraphenyl ether; 4,4'-dihydroxypentaphenyl ether; 4,4'-dihydroxy-2,6-dimethoxydiphenyl ether; 4,4'-dihydroxy-2,5-diethoxy-diphenyl ether, and the like. Mixtures of the dihydric phenols can also be employed and where dihydric phenol is mentioned herein, mixtures of such materials are considered to be included.

In general, any difunctional carboxylic acid or its reactive derivative such as the acid halide conventionally used in the preparation of polyesters may be used for the preparation of polyestercarbonates useful in formulating the compositions of the present invention. In general, the carboxylic acids which may be used include the aliphatic carboxylic acids, aliphatic aromatic carboxylic acids, or aromatic carboxylic acids. In one particular embodiment the aromatic dicarboxylic acids or their reactive derivatives such as the aromatic diacid halides are employed as they produce the aromatic polyestercarbonates which are most useful, from the standpoint of physical properties, in the practice of the instant invention.

These carboxylic acids may be represented by the Formula (V)

$$R^2\!\!-\!\!(\!R^1\!)_{\overline{q}}\!\!-\!\!COOH; \qquad (V)$$

wherein $R^1$ represents an alkylene, alkylidene or cycloaliphatic group in the same manner as set out above for E in Formula (IV); an alkylene, alkylidene or cycloaliphatic group containing ethylenic unsaturation; an aromatic radical such as phenylene, naphthylene, bisphenylene, substituted phenylene, and the like; two or more aromatic groups connected through non-aromatic linkages such as those defined by E in Formula (IV); or a divalent aliphatic aromatic hydrocarbon radical such as an aralkyl or alkaryl radical. $R^2$ is either a carboxyl or a hydroxyl group. "q" represents the integer one where $R^2$ is a hydroxyl group and either zero or one where $R^2$ is a carboxyl group. Thus the difunctional carboxylic acid will either be a monohydroxy monocarboxylic acid or a dicarboxylic acid. In one particular embodiment the aromatic dicarboxylic acids or their reactive derivatives such as, for example, the acid halides, are employed. The aromatic dicarboxylic acids, as represented by Formula (V), $R^2$ is a carboxyl group and $R^1$ is an aromatic radical such as phenylene, biphenylene, naphthylene, substituted phenylene, etc., two or more aromatic groups connected through non-aromatic linkages; or a divalent aliphatic aromatic radical. Some nonlimiting examples of suitable preferred aromatic dicarboxylic acids which may be used in preparing the copolyestercarbonate resins include phthalic acid, isophthalic acid, terephthalic acid, homophthalic acid, o-, m-, and p-phenylenediacetic acid, the polynuclear aromatic acids such as diphenic acid, and 1,4-naphthalic acid. The aromatics may be substituted with Y groups in the same manner as the Formula I aromatics are substituted. These acids may be used individually or as mixtures of two or more different acids.

In one embodiment, the carbonate precursor comprises a carbonyl halide, a carbonate ester, or a haloformate. Suitable carbonyl halides which can be employed include but are not limited to carbonyl chloride and carbonyl bromide. Suitable carbonate esters which may be employed include but are not limited to herein are diphenyl carbonate, di(halophenyl) carbonates such as di(chlorophenyl)carbonate, di(bromophenyl)carbonate, di(trichlorophenyl)carbonate, di(tribromophenyl)carbonate; di(alkylphenyl)carbonates such as ditolyl carbonate; di(naphthyl)carbonate, di(chloronaphthyl) carbonate, phenyltolyl carbonate, chloronaphthyl chlorophenyl carbonate, and the like. Suitable haloformates include but are not limited to bishaloformates of dihydric phenols such as bischloroformates of hydroquinone, and the like or glycols such as bis-haloformates of ethylene glycol, neopentyl glycol, polyethylene glycol, and the like. In one particular embodiment the carbonate precursor employed is phosgene (carbonyl chloride).

In various embodiments, the copolyestercarbonates which may be employed in the compositions of the present disclosure may be prepared by following the methods in U.S. Pat. Nos. 3,020,331; 3,169,121; 3,207,814; 4,194,038 and 4,156,069.

In one embodiment, the copolyestercarbonate are derived from dihydric phenols, aromatic dicarboxylic acids or their reactive ester forming derivatives such as the aromatic diacid halides, and phosgene. In one embodiment, the aromatic copolyestercarbonates are derived from bisphenol-A, isophthalic acid, terephthalic acid, or a mixture of isophthalic acid and terephthalic acid, or the reactive derivatives of these acids such as terephthaloyl dichloride, isophthaloyl dichloride, or a mixture of isophthaloyl dichloride and terephthaloyl dichloride, and phosgene.

The molar proportion of ester units in the copolyestercarbonate is about 25 to about 90 mole percent, and more specifically, from about 35 to about 80 mole percent. In another embodiment, the molar range of terephthalate units, the remainder of the copolymer ester units typically comprising isophthalate units is about 2 to about 90 percent, and more specifically about 5 to about 25 percent.

In one embodiment, the aromatic carbonate polymers are commonly mixed with additional polymers to produce blends having varying physical properties and utility. Suitable polymers to produce the blends may be additional resins selected from the group consisting of polyamides, polyesters, polycarbonates; olefin polymers such as ABS, polystyrene, polyethylene; polysiloxanes, polysilanes and polysulfones. In one embodiment, the polycarbonate content of such blends can range between 1 to 99 parts by weight to correspondingly 99 to 1 parts by weight, based on 100 weight parts, of aromatic carbonate polymer to the additional polymer. Within this range, the one or more additional resins may be present preferably in an amount less than or equal to 50 weight percent, more preferably less than or equal to 35 weight percent and most preferably less than or equal to about 30 weight percent based on the total weight of the polymer composition.

In one particular embodiment, the second polymer is a polyester. Suitable polyesters may be derived from an aliphatic, aliphatic ether, or cycloaliphatic diol, containing from 2 to about 10 carbon atoms and one or more aromatic or cycloaliphatic dicarboxylic acids. In one embodiment the polyester is derived from an aliphatic diol and an aromatic dicarboxylic acid. Suitable polyesters include but are not limited to poly(alkylene terephthalates), i.e. poly(ethylene terephthalate) and poly(butylene terephthalate).

The polyesters employed may preferably have an intrinsic viscosity of from about 0.4 to about 2.0 dl/g., as measured in a 60:40 phenol:tetrachloroethane mixture, or similar solvent at 23° C.-30° C. Such polyesters may be prepared according to U.S. Pat. No. 2,901,466.

The polymer composition may contain various other additives, which may be used alone or in combination. These additives include such materials as thermal stabilizers, antioxidants, UV stabilizers, plasticizers, visual effect enhancers, extenders, antistatic agents, catalyst quenchers, mold releasing agents, fire retardants, blowing agents, impact modifiers and processing aids. The different additives that can be incorporated in the polymer compositions of the present disclosure are typically commonly used and known to those skilled in the art. Typically the amount of additives added is such that they do not interfere with the expected utility of the resultant polymer composition.

Visual effect enhancers, sometimes known as visual effects additives or pigments may be present in an encapsulated form, a non-encapsulated form, or laminated to a particle comprising polymeric resin. Some non-limiting examples of visual effects additives are aluminum, gold, silver, copper, nickel, titanium, stainless steel, nickel sulfide, cobalt sulfide, manganese sulfide, metal oxides, white mica, black mica, pearl mica, synthetic mica, mica coated with titanium dioxide, metal-coated glass flakes, and colorants, including but not limited, to Perylene Red. The visual effect additive may have a high or low aspect ratio and may comprise greater than 1 facet. Dyes may be employed such as Solvent Blue 35, Solvent Blue 36, Disperse Violet 26, Solvent Green 3, Anaplast Orange LFP, Perylene Red, and Morplas Red 36. Fluorescent dyes may also be employed including, but not limited to, Permanent Pink R (Color Index Pigment Red 181, from Clariant Corporation), Hostasol Red 5B (Color Index #73300, CAS #522-75-8, from Clariant Corporation) and Macrolex Fluorescent Yellow 10GN (Color Index Solvent Yellow 160:1, from Bayer Corporation). Pigments such as titanium dioxide, zinc sulfide, carbon black, cobalt chromate, cobalt titanate, cadmium sulfides, iron oxide, sodium aluminum sulfosilicate, sodium sulfosilicate, chrome antimony titanium rutile, nickel antimony titanium rutile, and zinc oxide may be employed. Visual effect additives in encapsulated form usually comprise a visual effect material such as a high aspect ratio material like aluminum flakes encapsulated by a polymer. The encapsulated visual effect additive has the shape of a bead.

Non-limiting examples of antioxidants that can be used in the polymer compositions disclosure include tris(2,4-di-tert-butylphenyl)phosphite; 3,9-di(2,4-di-tert-butylphenoxy)-2,4,8,10-tetraoxa-3,9-diphosphaspiro[5.5]undecane; 3,9-di(2,4-dicumylphenoxy)-2,4,8,10-tetraoxa-3,9-diphosphaspiro[5.5]undecane; tris(p-nonylphenyl)phosphite; 2,2',2''-nitrilo[triethyl-tris[3,3',5,5'-tetra-tertbutyl-1,1'-biphenyl-2'-diyl]phosphite]; 3,9-distearyloxy-2,4,8,10-tetraoxa-3,9-diphosphaspiro[5.5]undecane; dilauryl phosphite; 3,9-di[2,6-di-tert-butyl-4-methylphenoxy]-2,4,8,10-tetraoxa-3,9-diphosphaspiro[5.5]undecane; tetrakis(2,4-di-tert-butylphenyl)-4,4'-bis(diphenylene)phosphonite; distearyl pentaerythritol diphosphite; diisodecyl pentaerythritol diphosphite; 2,4,6-tri-tert-butylphenyl-2-butyl-2-ethyl-1,3-propanediol phosphite; tristearyl sorbitol triphosphite; tetrakis(2,4-di-tert-butylphenyl)-4,4'-biphenylene diphosphonite; (2,4,6-tri-tert-butylphenyl)-2-butyl-2-ethyl-1,3-propanediolphosphite; triisodecylphosphite; and mixtures of phosphites containing at least one of the foregoing.

The polymer composition may optionally comprise an impact modifier. The impact modifier resin added to the polymer composition in an amount corresponding to about 1% to about 30% by weight, based on the total weight of the composition. Suitable impact modifiers include those comprising one of several different rubbery modifiers such as graft or core shell rubbers or combinations of two or more of these modifiers. Impact modifiers are illustrated by acrylic rubber, ASA rubber, diene rubber, organosiloxane rubber, ethylene propylene diene monomer (EPDM) rubber, styrene-butadiene-styrene (SBS) rubber, styrene-ethylene-butadiene-styrene (SEBS) rubber, acrylonitrile-butadiene-styrene (ABS) rubber, methacrylate-butadiene-styrene (MBS) rubber, styrene acrylonitrile copolymer and glycidyl ester impact modifier.

The term "acrylic rubber modifier" may refer to multistage, core-shell, interpolymer modifiers having a crosslinked or partially crosslinked (meth)acrylate rubbery core phase, preferably butyl acrylate. Associated with this crosslinked acrylic ester core is an outer shell of an acrylic or styrenic resin, preferably methyl methacrylate or styrene, which interpenetrates the rubbery core phase. Incorporation of small amounts of other monomers such as acrylonitrile or (meth)acrylonitrile within the resin shell also provides suitable impact modifiers. The interpenetrating network is provided when the monomers forming the resin phase are polymerized and cross-linked in the presence of the previously polymerized and cross-linked (meth)acrylate rubbery phase.

Suitable impact modifiers are graft or core shell structures with a rubbery component with a Tg below 0° C., preferably between about −40° to −80° C., composed of poly alkylacrylates or polyolefins grafted with polymethylmethacrylate (PMMA) or styrene acrylonitrile (SAN). Preferably the rubber content is at least 10 wt %, more preferably greater than 40 wt %, and most preferably between about 40 and 75 wt %.

Other suitable impact modifiers are the butadiene coreshell polymers of the type available from Rohm & Haas, for example Paraloid® EXL2600. Suitable impact modifiers can also comprise a two stage polymer having a butadiene based rubbery core and a second stage polymerized from methylmethacrylate alone or in combination with styrene. Other suitable rubbers are the ABS types Blendex® 336 and 415, available from GE Specialty Chemicals. Both rubbers are based on impact modifier resin of SBR rubber. Although several rubbers have been described, many more are commercially available. Any rubber may be used as an impact modifier as long as the impact modifier does not negatively impact the physical or aesthetic properties of the polymer composition.

Non-limiting examples of processing aids that can be used include Doverlube® FL-599 (available from Dover Chemical Corporation), Polyoxyter® (available from Polychem Alloy Inc.), Glycolube P (available from Lonza Chemical Company), pentaerythritol tetrastearate, Metablen A-3000 (available from Mitsubishi Rayon), neopentyl glycol dibenzoate, and the like.

Non-limiting examples of UV stabilizers that can be used include 2-(2'-Hydroxyphenyl)-benzotriazoles, e.g., the 5'-methyl-; 3',5'-di-tert.-butyl-; 5'-tert.-butyl-; 5'-(1,1,3,3-tetramethylbutyl)-; 5-chloro-3',5'-di-tert.-butyl-; 5-chloro-3'-tert.-butyl-5'-methyl-; 3'-sec.-butyl-5'-tert.-butyl-; 3'-alpha-methylbenzyl-5'-methyl; 3'-alpha-methylbenzyl-5'-methyl-5-chloro-; 4'-hydroxy-; 4'-methoxy-; 4'-octoxy-; 3',5'-di-tert.-amyl-; 3'-methyl-5'-carbomethoxyethyl-; 5-chloro-3', 5'-di-tert.-amyl-derivatives; and Tinuvin® 234 (available from Ciba Specialty Chemicals). Also suitable are the 2,4-bis-(2'-hydroxyphenyl)-6-alkyl-s-triazines, e.g., the 6-ethyl-; 6-heptadecyl- or 6-undecyl-derivatives. 2-hydroxybenzophenones e.g., the 4-hydroxy-; 4-methoxy-; 4-octoxy-; 4-decyloxy-; 4-dodecyloxy-; 4-benzyloxy-; 4,2', 4'-trihydroxy-; 2,2',4,4'-tetrahydroxy- or 2'-hydroxy-4,4'-dimethoxy-derivative. 1,3-bis-(2'-hydroxybenzoyl)-benzenes, e.g., 1,3-bis-(2'-hydroxy-4'-hexyloxy-benzoyl)-benzene; 1,3-bis-(2'-hydroxy-4'-octyloxy-benzoyl)-benzene or 1,3-bis-(2'-hydroxy-4'-dodecyloxybenzoyl)-benzene may also be employed. Esters of optionally substituted benzoic acids, e.g., phenylsalicylate; octylphenylsalicylate; dibenzoylresorcin; bis-(4-tert.-butylbenzoyl)-resorcin; benzoylresorcin; 3,5-di-tert.-butyl-4-hydroxybenzoic acid-2,4-di-tert.-butylphenyl ester or -octadecyl ester or -2-methyl-4,6-di-tert.-butyl ester may likewise be employed. Acrylates, e.g., alpha-cyano-beta, beta-diphenylacrylic acid-ethyl ester or isooctyl ester, alpha-carbomethoxy-cinnamic acid methyl ester, alpha-cyano-beta-methyl-p-methoxy-cinnamic acid methyl ester or -butyl ester or N(beta-carbomethoxyvinyl)-2-methyl-indoline may likewise be employed. Oxalic acid diamides, e.g., 4,4'-di-octyloxy-oxanilide; 2,2'-di-octyloxy-5,5'-di-tert.-butyl-oxanilide; 2,2'-di-dodecyloxy-5,5-di-tert.-butyl-oxanilide; 2-ethoxy-2'-ethyl-oxanilide; N,N'-bis-(3-dimethyl-aminopropyl)-oxalamide; 2-ethoxy-5-tert.-butyl-2'-ethyloxanilide and the mixture thereof with 2-ethoxy-2'-ethyl-5,4'-di-tert.-butyl-oxanilide; or mixtures of ortho- and para-methoxy- as well as of o- and p-ethoxy- disubstituted oxanilides are also suitable as UV stabilizers. Preferably the ultraviolet light absorber used in the instant compositions is 2-(2-hydroxy-5-methylphenyl)-2H-benzotriazole; 2-(2-hydroxy-3,5-di-tert-amylphenyl)-2H-benzotriazole; 2-[2-hydroxy-3,5-di-(alpha,alpha-dimethylbenzyl)phenyl]-2H-benzotriazole; 2-(2-hydroxy-5-tert-octylphenyl)-2H-benzotriazole; 2-hydroxy-4-octyloxybenzophenone; nickel bis(O-ethyl 3,5-di-tert-butyl-4-hydroxybenzylphosphonate); 2,4-dihydroxybenzophenone; 2-(2-hydroxy-3-tert-butyl-5-methylphenyl)-2H-benzotriazole; nickel butylamine complex with 2,2'-thiobis(4-tert-butylphenol); 2-ethoxy-2'-ethyloxanilide; 2-ethoxy-2'-ethyl-5,5'-ditert-butyloxanilide or a mixture thereof.

Non-limiting examples of fire retardants that can be used include potassium diphenylsulfone sulfonate, and phosphite esters of polyhydric phenols, such as resorcinol and bisphenol A.

Non-limiting examples of mold release compositions include esters of long-chain aliphatic acids and alcohols such as pentaerythritol, guerbet alcohols, long-chain ketones, siloxanes, alpha.-olefin polymers, long-chain alkanes and hydrocarbons having 15 to 600 carbon atoms.

Generally, it is not desirable to choose a compound that would require more than 5 weight parts per 100 parts by weight resin to achieve the desired degree of stabilization. In one embodiment, as discussed about the amount stabilizing compound be added is in an amount of at least about 0.1 parts by weight resin. Mixtures of stabilizing compounds may also be employed. Advantageously the use of solid cyclic aliphatic alcohol compounds in the manner described above, inhibit color formation due to exposure to sterilizing radiation.

The admixtures of the aromatic carbonate polymer and stabilizing compound are prepared by standard techniques, e.g., by blending, dry mixing, and/or melt extruding at an elevated temperature. The polymer compositions may be molded into various shaped articles by a variety of means such as injection molding, extrusion, rotational molding, blow molding and thermoforming.

The radiation employed to achieve sterilization of the particular object is ionizing radiation, usually gamma radiation produced form a cobalt 50 or cesium 137 radioactive nuclei. The quantity of gamma radiation required for sterilization is generally about 25 kGy (kilograys) to about 75 kGy, preferably about 25 kGy to about 50 kGy.

It is also contemplated that the polymer composition may be utilized in multi-layer materials. One such example is as a cap layer on a substrate. Useful substrates would be those that that are compatible with the polymer composition and would suffer little or no delamination under processing or normal use conditions. Multi-layer materials may be formed by a number of methods, including but not limited to co-extrusion, compression molding, and lamination.

The disclosure is explained in more detail with reference to the following non-limiting Examples.

EXAMPLES

The following examples are set forth to provide those of ordinary skill in the art with a detailed description of how the methods claimed herein are evaluated, and are not intended to limit the scope of what the inventors regard as their invention.

The source and the physical state of the additives used in examples and the comparative examples (CE) are listed in Table 1. Several compositions containing different additives and aromatic carbonate polymers were prepared. Specific amount of additives were mixed with an aromatic carbonate polymer powder having a molecular weight of about 36000 and compounded into pellets. Compounding was carried out using W&P ZSK 25 Laboratory Twin-Screw Extruder with standard screw design for polycarbonate polymers. A typical compounding condition is given in Table 2. The abbreviation "RPM" stands for revolutions per minute. Polycarbonate stabilizers Irgafos 168 from Ciba Specialty Chemicals (0.03 weight %) and mold release agent PETS (0.25 weight %) were added to each of the formulations.

Plaques of each formulation were injection molded using L&T Demag De-Tech 60 LNC4-E molding machine. A typical molding condition is given in Table 3. The abbreviation "psi" stands for pounds per square inch. Molded plaques (3.02 mm thick) used for exposing to gamma radiation and YI measurements. The plaques were placed inside a paper box and exposed to gamma radiation.

The amount of stabilizing compound used, the approximate radiation dosage to which the plaques were subjected and the subsequent difference observed in yellowness index (YI) is tabulated in Table 4. The YI measurements were carried out on the Coloureye Macbeth instrument in accordance with ASTM E 313-00.

TABLE 1

Stabilizing compounds used in preparing the various compositions

| Stabilizing compound | Source | Physical state at Room Temp (25° C.). |
|---|---|---|
| 2,2,4,4-Tetramethyl-1,3-cyclobutanediol (TMCBD) | Aldrich | Solid |

TABLE 1-continued

Stabilizing compounds used in preparing the various compositions

| Stabilizing compound | Source | Physical state at Room Temp (25° C.). |
|---|---|---|
| Hexylene glycol (HG) | Aldrich | Liquid |
| 1,4-Cyclohexandiol | Aldrich | Solid |
| 1,4-Anhydroerythritol 95% | Aldrich | Liquid |
| Cyclobutane methanol, 99% | Aldrich | Liquid |
| 4,4'-Bicyclohexyldiol | Fluka | Solid |
| Isomannide | Aldrich | Solid |
| Isosorbide | Aldrich | Solid |
| Dipentaerythritol | Aldrich | Solid |

TABLE 2

Compounding conditions

| Process Parameter | Value |
|---|---|
| Temperature Feeding Zone | 93° C. |
| Temperature Zone 1 | 121° C. |
| Temperature Zone 2 | 260° C. |
| Temperature Zone 3 | 271° C. |
| Temperature Zone 4 | 282° C. |
| Temperature of Throat/Die | 289° C. |
| Vacuum Applied | Yes |
| Screw Speed | 400 RPM |
| Temperature of Melt | 321° C. |
| Current/Torque | About 80 Amperes |

TABLE 3

Molding conditions

| Process Parameter | Value |
|---|---|
| Temperature Feeding Zone | 93° C. |
| Temperature Zone 1 | 277° C. |
| Temperature Zone 2 | 288° C. |
| Temperature Zone 3 | 299° C. |
| Temperature of Nozzle | 299° C. |
| Temperature of Melt | 299° C. |
| Temperature of Mold | 82° C. |
| Sample Drying Time | 4 Hours |
| Sample Drying Temperature | 121° C. |
| Cycle Time | 35 Seconds |
| Injection time | 6 Seconds |
| Injection Speed | About 1 inch/second |
| Injection Pressure | 1100 Psi |
| Decompression | 1 Inch |
| Switch Point | 0.25 Inch |
| Screw Speed | 100 RPM |
| Holding Pressure | 600 Psi |
| Holding Time | 10 Seconds |
| Cooling Time | 25 Seconds |

TABLE 4

| Ex. | Additive (wt % in the formulation) | YI pre gamma | YI after exposure to 25 kGy | dYI (25 kGy) | YI after exposure to 50 kGy | dYI (50 kGy) | YI after exposure to 75 kGy | dYI (75 kGy) |
|---|---|---|---|---|---|---|---|---|
| 1 | TMCBD (0.2%) | 1.4 | 14.1 | 12.7 | 19.1 | 17.7 | 30.7 | 29.3 |
| 2 | TMCBD (0.4%) | 1.3 | 9.4 | 8.1 | NA | NA | NA | NA |
| 3 | TMCBD (0.4%) + HG (0.1%) | 1.3 | 7.8 | 6.5 | 12.9 | 11.6 | 20.6 | 19.3 |
| 4 | 1,4-Cyclohexandiol (0.2%) | 2.3 | 15.0 | 12.7 | 25.6 | 23.3 | 43.4 | 41.1 |

TABLE 4-continued

| Ex. | Additive (wt % in the formulation) | YI pre gamma | YI after exposure to 25 kGy | dYI (25 kGy) | YI after exposure to 50 kGy | dYI (50 kGy) | YI after exposure to 75 kGy | dYI (75 kGy) |
|---|---|---|---|---|---|---|---|---|
| 5 | 1,4-Cyclohexandiol (0.4%) | 1.7 | 15.3 | 13.6 | 24.7 | 23.0 | 42.9 | 41.2 |
| 6 | TMCBD (0.2%) | 1.8 | 10.8 | 9.0 | 19.3 | 17.5 | NA | NA |
| CE-1 | No additive | 1.6 | 26.2 | 24.6 | 34.2 | 32.6 | 56.5 | 54.9 |
| CE-2 | HG 0.2% | 1.5 | 14.8 | 13.3 | 20.4 | 18.9 | 32.5 | 31.0 |
| CE-3 | 4,4'-Bicyclohexyldiol (0.2%) | 1.9 | 15.7 | 13.8 | 29.3 | 27.5 | NA | NA |
| CE-3 | Isomannide (0.2%) | 2.0 | 17.6 | 15.6 | 28.2 | 26.2 | NA | NA |
| CE-4 | Isosorbide (0.2%) | 1.9 | 16.0 | 14.1 | 29.7 | 27.8 | NA | NA |
| CE-5 | Dipentaerythritol (0.2%) | 2.0 | 17.8 | 15.8 | 33.1 | 31.0 | NA | NA |

Examples 1-6 wherein the solid cyclic aliphatic alcohol stabilizing compounds have been used as additive surprisingly show a relatively lower YI as compared to CE-1 to CE-5 even after being subjected to about 75 kGy radiation. The dYI (difference in yellowness index before and after being subjected to sterilizing radiation) is also relatively lower or comparable on considering Examples 1-10 and CE-1 to E-5. Also Examples 2 and, 5 indicate that higher percentage of additive may be employed and the resultant compositions show lower dYI. Example 3 also indicates that when TMCBD is combined with liquid HG the dYI is relatively less when compared to using TMCBD alone. CE-2 shows good results when HG, a liquid additive is employed since HG has a lower flash point of about 93.34° C. which is lower than the temperature used for processing the composition there exists a possibility of losing HG and also it could be a potential hazard.

While the disclosure has been described with reference to an exemplary embodiment, it will be understood by those skilled in the art that various changes may be made and equivalents may be substituted for elements thereof without departing from the scope of the invention. In addition, many modifications may be made to adapt a situation or material to the teachings of the disclosure without departing from the essential scope thereof. Therefore, it is intended that the disclosure not be limited to the embodiment disclosed as the best mode contemplated for carrying out this invention, but that the disclosure will include all embodiments falling within the scope of the appended claims.

The invention claimed is:

1. An aromatic carbonate polymer composition, comprising:
   an aromatic carbonate polymer; and
   a solid phase cyclic aliphatic alcohol compound in an amount effective to inhibit color formation upon exposure to sterilizing radiation, wherein said solid phase cyclic aliphatic alcohol compound is 2,2,4,4-tetramethylcyclobutane-1,3-diol, wherein the solid phase cyclic aliphatic alcohol compound is in an amount of at least 0.1 parts by weight per 100 parts by weight of said aromatic carbonate polymer.

2. The aromatic carbonate polymer composition of claim 1, wherein the solid phase cyclic aliphatic alcohol compound is in an amount of at least 0.1 parts to 0.4 parts by weight per 100 parts by weight of said aromatic carbonate polymer.

3. The aromatic carbonate polymer composition of claim 1, further comprising at least one linear aliphatic diol selected from the group consisting of ethylene glycol, propylene glycol, 1,3-propane diol, 1,2-butanediol, 1,4-butanediol, meso-2,3-butanediol, 1,2-pentanediol, 2,3-pentanediol, 1,4-pentane diol, 1,4-hexanediol and 2-methyl-2,4-pentanediol.

4. The aromatic carbonate polymer composition of claim 1, wherein said aromatic carbonate resin is an aromatic polycarbonate resin.

5. The aromatic carbonate polymer composition of claim 1, wherein said aromatic carbonate resin is an aromatic copolyester-carbonate resin.

6. The aromatic carbonate polymer composition of claim 1, further comprising at least one of a colorant, a filler, a fire retardant, a UV stabilizer, an antistatic agent, an acid scavenger, or a visual effects enhancer.

7. An article comprising the aromatic carbonate polymer composition of claim 1.

8. A method of color stabilizing an aromatic carbonate polymer composition, the method comprising:
   mixing an aromatic carbonate polymer and a solid phase cyclic aliphatic alcohol compound to form a homogeneous mixture, wherein the solid phase cyclic aliphatic alcohol compound is 2,2,4,4-tetramethylcyclobutane-1,3-diol, wherein the solid phase cyclic aliphatic alcohol compound is in an amount of at least 0.1 parts by weight per 100 parts by weight of said aromatic carbonate polymer;
   molding the composition into an article; and
   exposing the article to radiation in an amount effective to sterilize the article and produce a sterilized article.

9. The method of claim 8, wherein the sterilized article has a yellowness index as measured in accordance with ASTM E 313-00 less than the yellowness index that would be obtained by similarly treating an article comprising the aromatic carbonate polymer without the solid phase cyclic aliphatic alcohol compound.

10. The method of claim 8, wherein the solid phase cyclic aliphatic alcohol compound is in an amount of at least about 0.1 parts by weight per 100 parts by weight of said aromatic carbonate polymers.

11. The method of claim 8, further comprising adding at least one of a colorant, a filler, a fire retardant, a UV stabilizer, an antistatic agent, an acid scavenger, a visual effects enhancer during the mixing of the aromatic carbonate polymer and the solid phase cyclic aliphatic alcohol compound.

12. The method of claim 8, wherein exposing the article to radiation comprises 25 kGy to 75 kGy of gamma radiation.

* * * * *